April 1, 1969  E. W. BECHTOLD  3,436,145
FOCUSING LENS PAIR COMBINED WITH PHOTOCOPYING OBJECTIVE
Filed Sept. 17, 1964
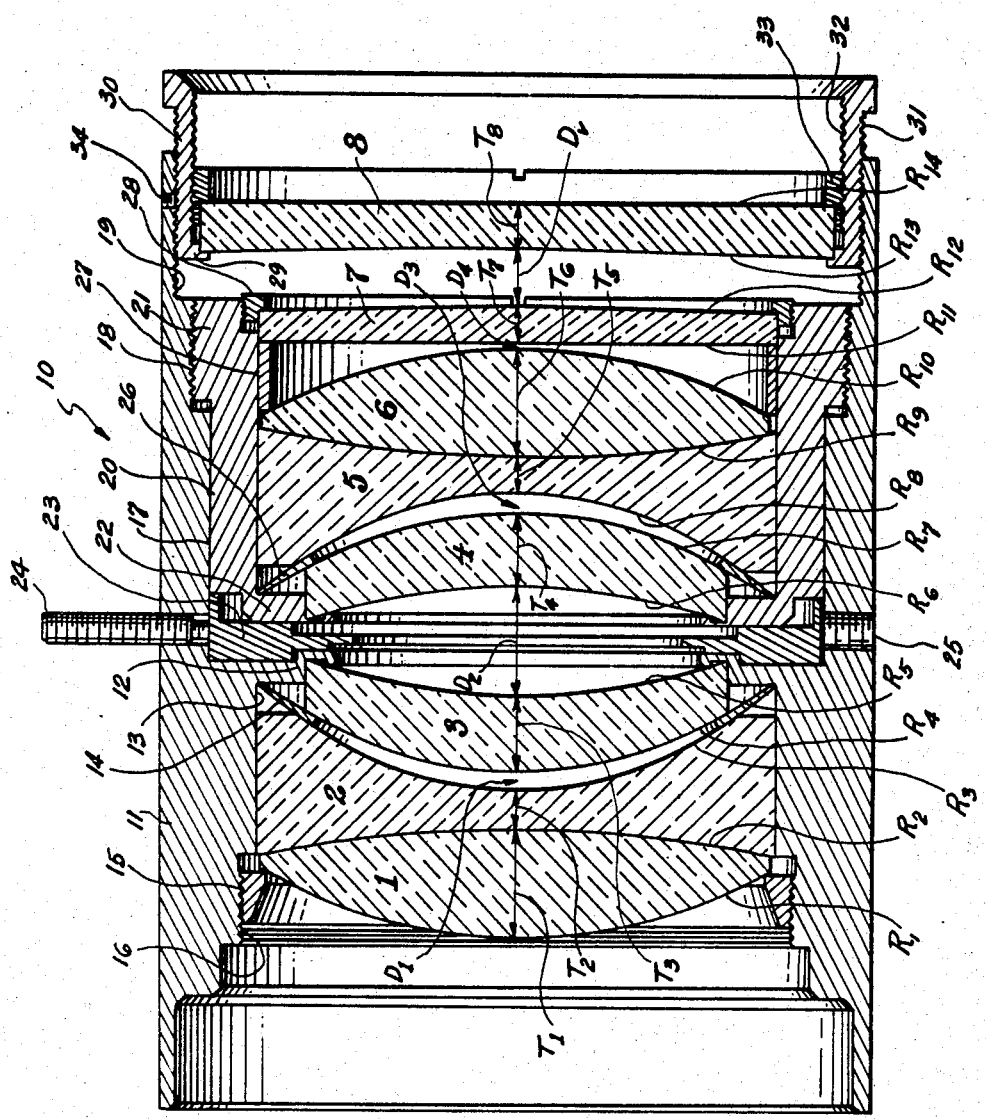
INVENTOR
EDWIN W. BECHTOLD
BY
ATTORNEY

United States Patent Office 3,436,145
Patented Apr. 1, 1969

3,436,145
FOCUSING LENS PAIR COMBINED WITH PHOTOCOPYING OBJECTIVE
Edwin W. Bechtold, Middle Village, N.Y., assignor to The Ednalite Corporation, Westchester County, N.Y., a corporation of New York
Filed Sept. 17, 1964, Ser. No. 397,116
Int. Cl. G02b 9/62, 9/04; G03b 27/52
U.S. Cl. 350—215     2 Claims

ABSTRACT OF THE DISCLOSURE

A lens assembly for a photocopying apparatus comprises a prime lens system having a number of lens elements all in fixed positions to each other to provide corrections for spherical and chromatic aberrations and curvature of field with a predetermined object-to-image distance, and plano-concave and plano-convex power lens elements of equal and opposite power arranged in axial alignment with the prime lens system with their concave and convex surfaces confronting and each having a ratio of focal length to useful aperture of at least 22, one of the power lens elements being fixed relative to the prime lens system and the other power lens element being axially movable for varying the air space therebetween, preferably by no more than 0.125 inch, for correspondingly adjusting the object-to-image distance of the lens assembly exactly to the requirements of the photo-copying apparatus.

---

This invention relates to a new and improved lens system particularly adapted for use in photo-copying apparatus.

Lens systems have been provided for use in photocopying apparatus that have only a very small amount of zonald field curvature, with approximately zero astigmatism at all field angles up to plus or minus thirty degrees from the axis. Such lens systems may be in the form of a symmetrical six-element lens assembly, for example, as disclosed in my co-pending application for U.S. Letters Patent, identified as Ser. No. 260,432, filed Feb. 25, 1963, now Patent No. 3,302,991, and can be manufactured and assembled so as to have an accurately predetermined effective or equivalent focal length (E.F.L.), and hence a correspondingly accurately predetermined object-to-image distance for any particular magnification. However, the structure of a photo-copying apparatus is frequently produced with a mechanically fixed distance from the plane at which the object to be copied is supported to the plane at which the photo-sensitive or copy paper or material is supported, and it has been found that such distance may vary as much as ⅛ inch from one apparatus to another by reason of the normal manufacturing tolerances. Thus, in mass producing photocopying apparatus the object-to-image distance of any one lens system may not correspond sufficiently to the fixed object-to-image distance of the mechanical structure in which it is installed and thereby result in inaccurate focussing and blurred images. If an attempt is made to adjust the object-to-image distance of the lens system to correspond to that of the mechanical structure of the apparatus by varying the spacing between lens components of the lens system, this seriously affects the optical characteristics of the lens system which is very sensitive to any change in its designed air spaces, particularly as to its corrections for flatness of field and astigmatism.

Accordingly, it is an object of this invention to provide a lens assembly for use in photo-copying apparatus which has only a very small amount of zonal field curvature with approximately zero astigmatism at all field angles up to plus or minus thirty degrees from the axis, and which affords the possibility of adjusting its equivalent focal length without introducing any objectionable aberrations or disturbing the correction for field curvature.

Another object is to provide a lens assembly of the described character that is structurally simple and relatively easy and inexpensive to produce, and wherein the adjustment of the equivalent focal length can be conveniently effected.

In accordance with an aspect of this invention, a lens assembly for a photo-copying apparatus comprises a prime lens system which may be a symmetrical six-element lens system having a pair of doublet members and a pair of meniscus lenses, and which has very good correction for flatness of field and astigmation over a wide angular coverage; and two substantially equal and opposite power lens elements movable relative to each other to adjust the equivalent focal length of the lens assembly without disturbing the prime lens system and without introducing chromatic or spherical aberrations or curvature of the field.

The above, and other objects, features and advantages of the invention, will be apparent in the following detailed description of an illustrative embodiment thereof which is to be read in connection with the accompanying drawing having, as its single view, an axial sectional view of the lens assembly.

Referring to the drawing in detail, it will be seen that a lens assembly 10 embodying this invention may have, as the prime lens system thereof, a symmetrical six-element lens system comprising a pair of cemented doublet members, one of the doublets including the crown 1 and flint 2, and the other of the doublets including the flint 5 and crown 6, and a pair of meniscus lenses 3 and 4. The indices, radii of curvature, thicknesses and air spaces of the lens elements comprising the above prime lens system are selected, for example, as disclosed fully in my above mentioned pending application Ser. No. 260,432, to provide only a very small amount of zonal field curvature, with approximately zero astigmation at all field angles up to plus or minus thirty degrees from the axis.

The following is a table of constructional data for a specific prime lens system that can be used in the lens assembly 10 embodying the invention:

TABLE I

| Lens: | Radii (inches) | Thickness and Air Space (inches) | Refractive Index | Dispersion |
|---|---|---|---|---|
| 1 | $R_1=+1.906$ | $T_1=.400$ | 1.617 | 55.0 |
|   | $R_2=-5.255$ | | | |
| 2 | | $T_2=.136$ | 1.550 | 45.8 |
|   | $R_3=+1.320$ | | | |
|   | | $D_1=.065$ | Air | |
|   | $R_4=+1.615$ | | | |
| 3 | | $T_3=.286$ | 1.5725 | 57.4 |
|   | $R_5=+2.368$ | | | |
|   | | $D_2=.409$ | Air | |
|   | $R_6=-2.368$ | | | |
| 4 | | $T_4=.286$ | 1.5725 | 57.4 |
|   | $R_7=-1.615$ | | | |
|   | | $D_3=.065$ | Air | |
|   | $R_8=-1.320$ | | | |
| 5 | | $T_5=.136$ | 1.550 | 45.8 |
|   | $R_9=5.255$ | | | |
| 6 | | $T_6=.400$ | 1.617 | 55.0 |
|   | $R_{10}=-1.906$ | | | |

In the foregoing table, R refers to the radius of curvature of each refracting surface identified by the corresponding sub-numeral on the drawing, and T and D respectively refer to the axial thicknesses of the lens members and air spaces.

The lens assembly 10, in accordance with this invention, further includes two substantially equal and opposite power lens elements 7 and 8 disposed at one side or the other of the prime lens system, with one of the elements 7 and 8 being axially movable for adjusting the equivalent focal length of the lens assembly without disturbing the very sensitive relative positions of the lens elements 1–6 of the prime lens system. By reason of the fact that lens elements 7 and 8 are substantially equal and opposite, the same do not contribute to curvature of the field.

The powers of lens elements 7 and 8 must be weak enough to avoid the introduction of chromatic and spherical aberrations, and it has been found that this requirement is satisfied when the ratio of focal length to useful aperture for each of lens elements 7 and 8 is at least 22, that is, $f/22$ or more. However, the powers of lens elements 7 and 8 cannot be so weak as to require relative movements thereof over unreasonable distances in order to effect the required adjustment of equivalent focal length. A particularly desirable arrangement is obtained with the specifically disclosed prime lens system when the additive lens elements 7 and 8 are $f/30$. Further, it has been found that the introduction of detectable aberrations is effectively avoided only when the ratio of the change in the object-to-image distance of the lens assembly to the movement of lens element 8 relative to element 7 for effecting such change is no greater than 1:1, and the range of movement of lens element 8 is no greater than about $5/32$ inch, that is, .1572 inch.

The following is a table of constructional data for specific additive power lens elements that can be used with the prime lens system of Table I:

TABLE II

| | Radii (inches) | Thickness and Air Space (inches) | Refractive Index | Dispersion |
|---|---|---|---|---|
| Lens: | | | | |
| 7 | $R_{11}=\infty$ | $D_4=.020$ | Air | |
| | $R_{12}=-20.866$ | $T_7=.148$ | 1.523 | 58.6 |
| | $R_{13}=-20.866$ | $D_v$ | Air | |
| 8 | $R_{14}=\infty$ | $T_8=.150$ | 1.523 | 58.6 |

In the foregoing table the symbols R, T and D have the previously defined meanings and the thickness of the air space between lens elements 7 and 8, indicated at $D_v$ on the drawing, is variable from a minimum dimension, which is as small as possible considering the necessity of supporting lens elements 7 and 8, for example, a distance of .040 inch between lenses 7 and 8, to a maximum dimension which is at least about .125 inch greater than the minimum dimension, for example, a distance of .165 inch between lenses 7 and 8.

The power lens elements 7 and 8 preferably are coated with a hard, low reflection, magnesium fluoride film.

With the various lenses having the constructional data given in Tables I and II above, the lens assembly 10, for 1:1 projection, has an object-to-image distance that is variable between a maximum of at least 32.031 inches and a minimum of no more than 31.906 inches in response to movement of lens element 8 relative to lens element 7 to a corresponding extent. In this regard, it will be noted that increasing the distance $D_v$ between lens elements 7 and 8 decreases the object-to-image distance of the assembly, and decreasing the distance $D_v$ serves to increase the object-to-image distance.

The lens 8 is pre-set, prior to installation in a photocopying apparatus, for an object-to-image distance of 31.937 inches at 1:1 projection, which corresponds to an equivalent focal length of 7.935 inches. It is to be understood that the constructional data of Tables I and II may be proportioned to provide lens assemblies having other equivalent or effective focal lengths.

As shown on the drawing, a preferred mounting structure for the lens assembly 10 includes a cylindrical barrel 11 which, substantially mid-way between its opposite ends, has an inwardly directed radial flange 12 against one side of which the meniscus lens 3 is seated. The barrel 11 has an internal cylindrical surface 13 extending from flange 12 to radially guide the biconcave flint 2, and an annular lens separator 14 is interposed between flint 2 and the adjacent meniscus 3 to establish the air space $D_1$ therebetween. The crown 1 which is cemented to flint 2 is engaged by a retainer ring 15 which is screwed into internal threads 16 formed within barrel 11 adjacent the outer end of cylindrical surface 13. Thus, lens elements 1, 2 and 3 of the prime lens system are fixedly held within barrel 11 by ring 15.

Barrel 11 further has an internal cylindrical surface 17 extending from flange 12 in the direction opposed to cylindrical surface 13 and having a substantially greater diameter than the latter. Stepped internal threads 18 and 19 extend successively from internal cylindrical surface 17 to the outer end of a barrel 11. A cylindrical mount 20 is received in, and guided by cylindrical surface 17, and has an externally threaded outer end portion 21 of increased diameter which is screwed into threads 18. The inner end of cylindrical mount 20 has a radially inward directed flange 22 forming a seat for the meniscus lens 4. An iris diaphragm 23, for example, of a type that is commercially available from Edmund Scientific Company, Barrington, N.J., as part No. 30,118, is located within barrel 11 between flange 12 of the latter and flange 22 of mount 20, and is manually adjustable, preferably between $f/4.7$ and $f/22$, by means of a stud 24 extending radially therefrom through a slot in barrel 11. A set screw 25 also extends through barrel 11 at the location of iris 23 and is engageable with the latter to lock the iris diaphragm within the barrel.

The cemented together flint 5 and crown 6 are received and guided within mount 20 and an annular lens separator 26 is interposed between the peripheral portions of meniscus lens 4 and flint 5 to establish the necessary air space $D_3$ therebetween.

The relatively fixed power lens element 7 is also located in mount 20 adjacent the outer end of the latter, and the air space $D_4$ between lens element 7 and crown 6 is established by a separator ring 27. The lens elements 4, 5, 6 and 7 are all locked in fixed positions in mount 20 by means of an externally threaded retaining ring 28 which is screwed into internal threads adjacent the outer end of mount 20 and bears against power lens element 7.

The adjustable power lens element 8 seats against a flange 29 extending radially inward from the axially inner end of an annular shell 30 which is externally threaded, as at 31, so as to be adjustably screwed into the internal threads 19 of barrel 11. The annular shell 30 is further internally threaded, as at 32, so as to receive an externally threaded retaining ring 33 by which power lens element 8 is held against the seat or flange 29. It will be apparent that turning of annular shell 30 relative to barrel 11 is effective to move shell 30 axially into, or out of barrel 11, thereby to adjust the axial spacing between power lens elements 7 and 8. Such relative movement of lens elements 7 and 8 adjusts the object-to-image distance of lens assembly 10 without disturbing the sensitive relative positions of the prime lens system constituted by lens elements 1–6. A set screw 34 extends through barrel 11 and is engageable with shell 30 for holding the latter against inadvertent displacement from its suitably adjusted position.

In manufacturing the lens assembly 10 embodying this invention, the shell 30 is initially adjusted to a position intermediate the limits of its axial adjustment relative to barrel 11, for example, to the position shown on the drawing, at which the power lens elements 7 and 8 cooperate with the prime lens system to provide an object-to-image distance that is substantially equal to the nominal distance between the supports for the object and for the photo-sensitive paper or other material in the mechanical structure of the photo-copying appartus. Thereafter, when lens assembly 10 is mounted within the mechanical structure of the photo-copying apparatus, shell 30 is suitably adjusted relative to barrel 11 to provide the necessary critical adjustment of the object-to-image distance of the lens assembly so that the same will exactly correspond to the related distance in the mechanical structure, whereupon set screw 34 is again secured to maintain the adjustment of the lens assembly. As mentioned above, during such adjustment of the object-to-image distance of the lens assembly, the corrections of the prime lens system for spherical and chromatic abberations and for curvature of field are not detectably influenced.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What is claimed is:
1. A lens assembly having a nominal equivalent focal length of 7.935 inches comprising a symmetrical six-element lens system having numerical data proportioned substantially as follows:

| Lens: | Radii (inches) | Thickness and Air Space (inches) | Refractive Index | Dispersion |
|---|---|---|---|---|
| 1 | $R_1 = +1.906$ | $T_1 = .400$ | 1.617 | 55.0 |
|   | $R_2 = -5.255$ | $T_2 = .136$ | 1.550 | 45.8 |
| 2 | $R_3 = +1.320$ | $D_1 = .065$ | Air | |
|   | $R_4 = +1.615$ | $T_3 = .286$ | 1.5725 | 57.4 |
| 3 | $R_5 = +2.368$ | $D_2 = .409$ | Air | |
|   | $R_6 = -2.368$ | $T_4 = .286$ | 1.5725 | 57.4 |
| 4 | $R_7 = -1.615$ | $D_3 = .065$ | Air | |
|   | $R_8 = -1.320$ | $T_5 = .136$ | 1.550 | 45.8 |
| 5 | $R_9 = 5.255$ | $T_6 = .400$ | 1.617 | 55.0 |
| 6 | $R_{10} = -1.906$ | | | | wherein the first column lists six lens elements in numerical order from front to rear, R refers to the radii of curvature of the refractive surfaces which are identified by the numerical subscripts in order from front to rear, and T and D respectively refer to the axial thicknesses of the lens elements and of the air spaces therebetween with the numerical subscripts identifying the order of such thicknesses and air spaces from front to rear; and two substantially equal and opposite power lens elements having numerical data proportioned substantially as follows:

| Lens: | Radii (inches) | Thickness and Air Space (inches) | Refractive Index | Dispersion |
|---|---|---|---|---|
| 7 | $R_{11} = \infty$ | $D_4 = .020$ | Air | |
|   | $R_{12} = -20.866$ | $T_7 = .148$ | 1.523 | 58.6 |
|   | $R_{13} = -20.866$ | $D_v$ | Air | |
| 8 | $R_{14} = \infty$ | $T_8 = .150$ | 1.523 | 58.6 | wherein $D_v$ is the axial air space between said power lens elements and is adjustable between a minimum of substantially .040 inch and a maximum of substantially .165 inch to effect an inversely corresponding change in the object-to-image distance for the lens assembly.

2. In a photo-copying apparatus having a mechanically fixed distance between supports for the object and for the photosensitive material, respectively; a lens assembly comprising a prime lens system having a plurality of lens elements all in fixed positional relation to each other to provide corrections for spherical and chromatic aberrations and curvature of field with a predetermined object-to-image distance nomially equal to said fixed distance between supports, and two power lens elements of equal and opposite powers arranged in axial alignment with said prime lens system and each having a ratio of focal length to useful aperture of at least 22, said power lens elements being respectively plano-concave and plano-convex and having their concave and convex surfaces confronting, one of said power lens elements being fixed relative to said prime lens system and the other of said power lens elements being axially movable relative to said one power lens element for varying the air space therebetween, and in which said power lens elements have numerical data proportioned substantially as follows:

| Lens: | Radii (inches) | Thickness and Air Space (inches) | Refractive Index | Dispersion |
|---|---|---|---|---|
| 7 | $R_{11} = \infty$ | $D_4 = .020$ | Air | |
|   | $R_{12} = -20.866$ | $T_7 = .148$ | 1.523 | 58.6 |
|   | $R_{13} = -20.866$ | $D_v$ | Air | |
| 8 | $R_{14} = \infty$ | $T_8 = .150$ | 1.523 | 58.6 | wherein the first column identifies the two power lens elements in order from front to rear, R refers to the radii of curvature of the refractive surfaces which are identified by the numerical subscripts in order from front to rear, T refers to the axial thicknesses of the lens elements which are identified by the numerical subscripts, and $D_v$ is the axial air space between said power lens elements and is adjustable between a minimum of substantially .040 inch and a maximum of substantially .165 inch to effect an inversely corresponding change in said object-to-image distance for the lens assembly, whereby the object-to-image distance of the lens assembly can be made to correspond exactly to said distance between supports without adversely affecting said corrections for spherical and chromatic aberrations and curvature of field.

References Cited

UNITED STATES PATENTS 2,956,475  10/1960  Harris et al. _____ 350—212
3,069,972  9/1962  Tibbetts et al. _____ 350—186
3,116,359  12/1963  Solisch _____ 350—212

FOREIGN PATENTS 971,992  4/1959  Germany.

DAVID SCHONBERG, Primary Examiner.

RONALD J. STERN, Assistant Examiner.

U.S. Cl. X.R.

355—55, 232